April 4, 1972  M. A. GOLDMAN  3,654,060
ABSORBENT SLITTED MULTI-PLY FILMS
Filed Dec. 29, 1969  2 Sheets-Sheet 1
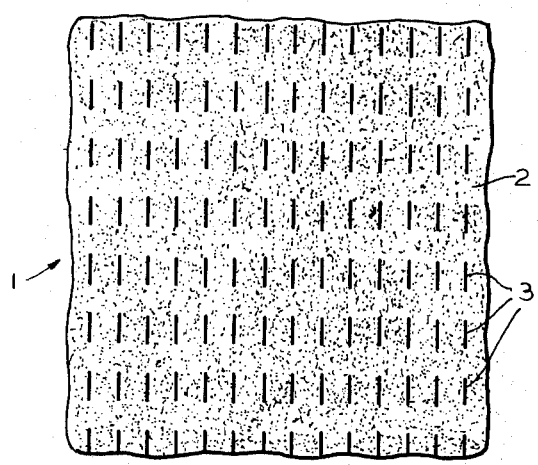
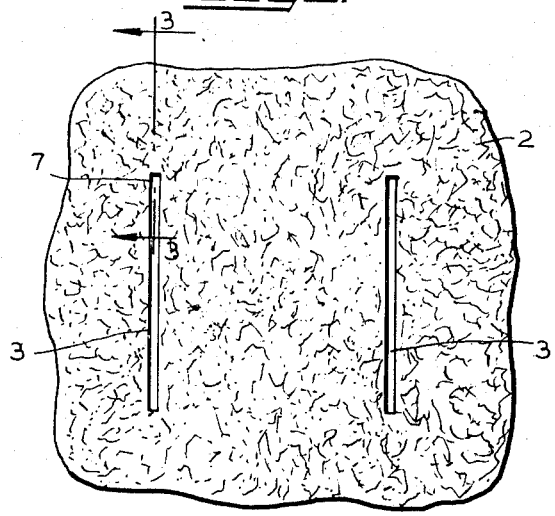
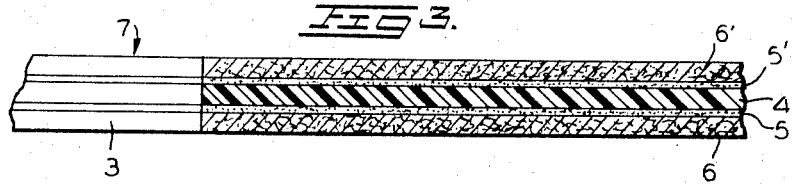
INVENTOR
MAURICE A. GOLDMAN
BY McCarthy Depaoli & O'Brien
ATTORNEY

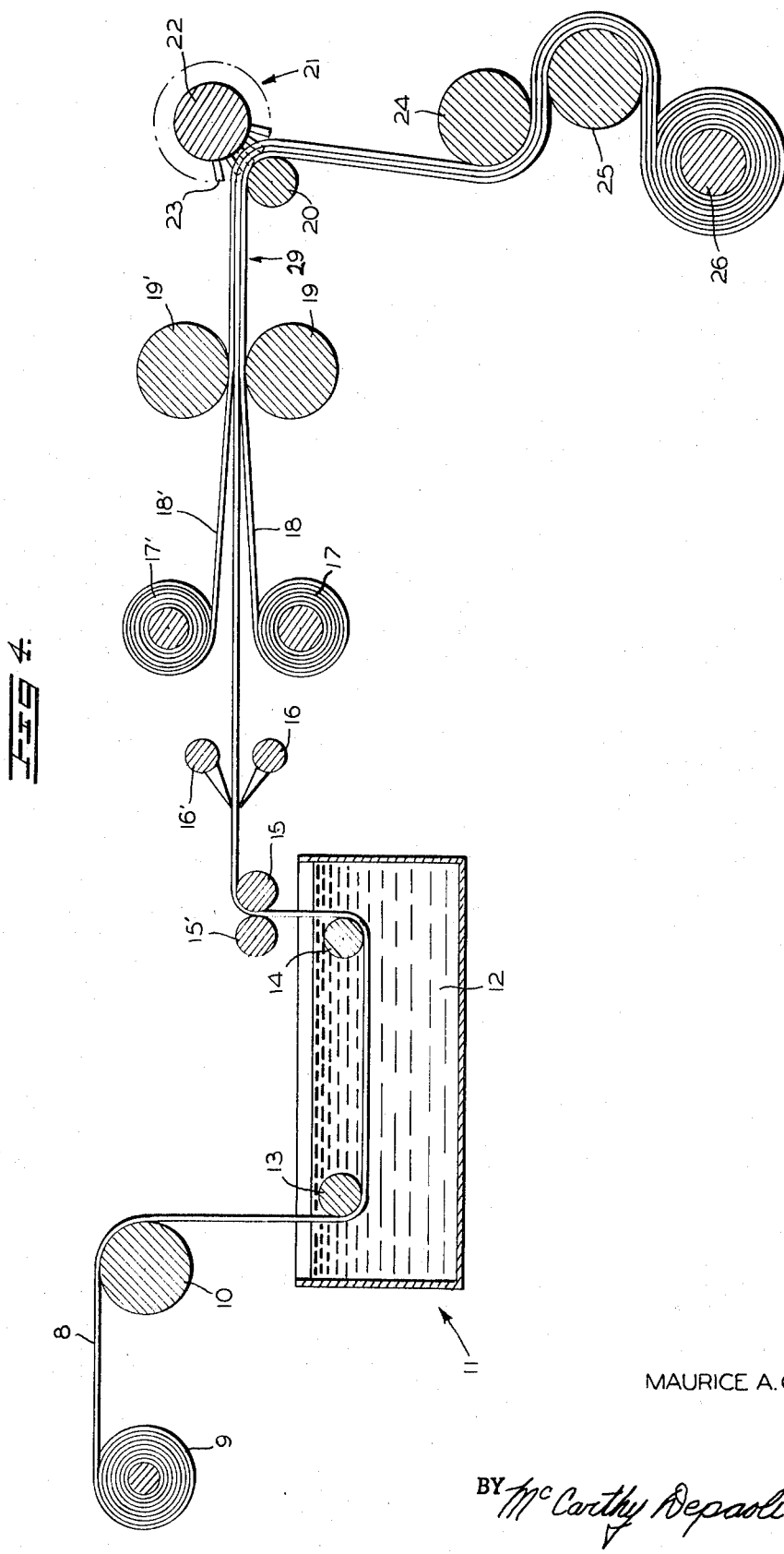

United States Patent Office 3,654,060
Patented Apr. 4, 1972

---

3,654,060
ABSORBENT SLITTED MULTI-PLY FILMS
Maurice A. Goldman, Newark, N.J., assignor to Fibre Products Laboratories, Inc.
Filed Dec. 29, 1969, Ser. No. 888,653
Int. Cl. A61l *15/00;* B32b *3/10, 31/18*
U.S. Cl. 161—112
10 Claims

ABSTRACT OF THE DISCLOSURE

An absorbent multi-ply film or sheeting product comprising a layer of plastic sheet material having adhered to at least one side thereof a fibrous facing layer, the multi-ply film or sheeting product being further provided with a plurality of elongated slits which extend at least through the plastic layer, the product being absorbent, supple, aseptic and flameproof and having sufficient absorbency, body and tensile strength for use as shielding materials, such as, protective coverings, drapes, clothing, etc., particularly in medical, surgical, and convalescent hospitals.

BACKGROUND OF THE INVENTION

In the operation of medical, surgical, and convalescent hospitals and other areas, it has long been apparent that the materials employed as protective coverings, clothing, drapes, room separators, etc. were not satisfactory as critical problems were constantly present relative to the availability and sterility of these materials. In recent years, with the use of hospital facilities increased to their fullest capacities, this problem has indeed become severe.

Originally, and up to a few years ago, hospitals used protective coverings, garments, etc. manufactured from woven materials of the conventional type. However, with the great increases in usage, the laundry and sterilization facilities of the hospitals were taxed to their utmost with resultant losses in quality as to cleanliness and sterility of the materials.

In the face of this problem, hospitals have turned to the use of materials manufactured from paper, the advantage of such being obvious. The most obvious advantage of the paper materials is that they can be used once and then disposed of thus obviating the need for the laundry and sterilization facilities. However, the use of these paper materials has not entirely solved the problem, primarily because of their lack of substantial strength and absorbability. Moreover, the materials formed from paper did not possess sufficient body for all uses.

The above enumerated problems have also been present in areas other than in hospital supplies as prior art products in analogous areas have created similar problems. Thus, known materials in areas where absorbent and permeable materials are required have been faced with similar situations. Therefore, it is apparent that a need clearly exists in the art for absorbent products which possess all the advantages of the known materials but do not suffer from the prior disadvantages in single service use.

SUMMARY OF THE INVENTION

It is, accordingly, one object of the present invention to provide a novel multi-ply film or sheet product which is characterized by excellent absorbency, breathability, body and tensile strength and which may be employed for single service duration and thereby obviates the problems inherent in similar fabric-type products now known to the art and which thus provides a new type of product for use in the hospital clothing field.

A further object of the present invention resides in the provision of a slitted, absorbent multi-ply film or sheet product which exhibits sufficient permeability, body and strength to compete with the conventional woven-type fabric products while also capable of being manufactured at a cost to compete with materials produced from paper.

A still further object of the invention resides in the provision of a slitted multi-ply film product which is permeable and absorbent and yet retains excellent strength on both the longitudinal and transverse axes, which is equivalent to warp and filling in a woven fabric, and which is inexpensive to produce.

Still another object of the present invention is to provide processes and apparatus for producing the slitted multi-ply film product of this invention.

Other objects and advantages of the present invention will become apparent as the description thereof proceeds.

In satisfaction of the foregoing objects and advantages, there is provided by the present invention an absorbent multi-ply film product which comprises a layer of plastic sheeting having applied on at least one side thereof a fibrous facing layer; said multi-ply film product being further provided with a plurality of slits extending therethrough; said product being characterized by excellent permeability, absorbency, body and strength.

There are also provided processes for the production of the slitted multi-ply film products of this invention which comprises adhering to one or both sides of a plastic sheeting a fibrous facing layer and thereafter placing a plurality of slits in the resulting multi-ply product.

BRIEF DESCRIPTION OF THE DRAWINGS

Reference is now made to the drawings accompanying this application wherein one form of the invention is illustrated and wherein:

FIG. 1 represents a perspective view of a preferred embodiment of the slitted multi-ply film product;

FIG. 2 represents a greatly enlarged view of the slitted multi-ply film product, particularly illustrating the depth and alignment of the slits in the preferred embodiment;

FIG. 3 is an enlarged side view in section of the film product of the invention, particularly illustrating the several layers of material which form the product and depth of the slits as seen along lines 3—3 of FIG. 2; and FIG. 4 shows in diagrammatic manner one form of method and apparatus for producing the multi-ply film product of this invention.

DESCRIPTION OF THE PREFERRED EMBODIMENTS

According to the present invention, it has now been found that multi-ply film products having a plurality of slitted areas therein, as more exactly specified hereinafter, are advantageously suited for uses in areas where the various types of woven and paper-type products have been employed heretofore, which products incorporate the advantages of both these prior art products. The surprising attractiveness of the products of this invention for the areas of use involved is attributable to absorbency, strength characteristics, and permeability of the slitted multi-ply film product of this invention while being inexpensive to produce, thus being in the realm of single service use. Thus, the fact that the products of this invention exhibit outstanding strength, equivalent to warp strength in a woven fabric, in combination with permeability for air and moisture as well as body and inexpensive manufacture, serves to make the products particularly adaptable for uses such as protective coverings, clothing, partitioning drapes, bed covers, etc. as well as in other areas where a product of this type is desired. The products are deemed to be especially beneficial as hospital materials for the uses mentioned as the products of this invention are inexpensive to produce and thus may be used one or more times and then disposed of. It is thus apparent that the product of this invention represents a substantial step forward in providing multiple areas of use for a new type of film product in areas where only woven or paper-type materials have been found satisfactory heretofore.

As specified hereinabove, the film product of this invention comprises a multi-ply type construction and may be referred to as a sandwich or laminate of a layer of plastic sheeting and at least one fibrous facing layer, such as, for example, a short staple fiber or cotton linter. More particularly, the product of this invention comprises a multi-ply construction comprising a plastic film or sheet as an interior layer and having applied as a facing on one or both sides thereof a layer or sheet of short fibrous materials, such as cotton linters or the like. After formation of the basic laminate or multi-ply film product, a plurality of slits are placed therein to provide the permeability and breathability characteristics to the film. It has been found that the spacing and location of the slits, as specified hereinafter, does not weaken the final product and thus the product retains excellent strength characteristics. It is to be appreciated that the fact that a plastic film is employed as the interior layer of the laminate or multi-ply construction serves to provide the unusual strength of the final product, whereas the plurality of slits placed therein provide the breathability and permeability characteristics of the product as well as body characteristics similar to those found in woven textiles.

The particular construction for the multi-ply product of this invention can be more clearly understood by reference to the drawings accompanying the application, particularly with respect to FIGS. 1, 2 and 3, wherein various views of a preferred embodiment of the invention are illustrated. Thus, in FIG. 1 there is shown a perspective view of the multi-ply film product 1 of this invention, wherein reference numeral 2 represents the fibrous layer forming one facing of the laminate. The multi-ply product 1 is further provided with a plurality of elongated slits 3 extending completely through the laminate. It is to be noted that the slits 3, as shown in the drawing, are of equal length and the spacings therebetween are of equal dimensions. It is also to be appreciated that the slits, as shown in FIG. 1, are in the production direction of the film, or orientation of the film, and this particular construction represents a preferred form of the invention.

In FIG. 2, an enlarged view of one side of the product of this invention, particularly that of FIG. 1, is illustrated. It may be seen in this enlarged view that numeral 2 again represents a fibrous facing layer, whereas reference numeral 3 represents an enlarged view of the plurality of slits placed in the product. As may be seen, the slits 3, when placed in the multi-ply product, serve to depress the top layers in such manner that some cohesiveness takes place between the several layers of the film product. It is to be appreciated, however, that the slits 3 are not merely punctures or apertures as none of the material of the product is completely removed thereby.

FIG. 3 represents a side view of the film product of FIG. 1 in enlarged section, as seen along lines 3—3 of FIG. 2, such that the several components or layers of the multi-ply film product may be viewed in detail. Thus, it may be seen that reference numeral 4 represents an interior layer of plastic sheeting, in the case of the product of FIG. 3, the plastic sheeting being a plastic layer such as polyethylene. Adhered to either side of the polyethylene plastic sheet as facing layers by means of adhesive layers 5 and 5' are layers of fibrous sheets 6 and 6', this construction forming the basic multi-ply film product. After this formation is completed, slit 3 is placed in the multi-ply or laminated product. As may be seen in FIG. 3, slit 3 extends completely through the multi-ply film product so as to ensure the passage of air therethrough. In viewing FIG. 3, it is to be appreciated that the area designated as 7 represents that part of the laminate in which the slit has been placed and this is illustrated as being in the background.

The interior layer of the multi-ply product of this invention is preferably a plastic sheeting, such as the well-known polyethylene and polypropylene type materials which are, of course, commercially available. Other types of plastic materials may be employed, however, such as polyester products, polystyrenes, and various other types of synthetic sheets, the material employed being dependent on the particular desired use of the final product. The plastic employed may be a finished sheet, an extruded sheet, or any other type whereby suitable products can be realized. It is to be understood that the plastic sheets employed as the interior layer in the multi-ply product of this invention may be non-oriented, biaxially oriented, or monoaxially oriented, the particular orientation of the film layer being dependent on the desired uses of ultimate product. This, of course, can be determined prior to formation of the film. It is preferred, however, to employ films oriented in the production direction of the product and in the direction of the slits, as such oriented films provide outstanding strength characteristics. The film may also be of any desired size or thickness, although it is preferred to employ films on the order of about one-half mil thickness.

As pointed out hereinabove, the interior film layer is provided on one or both sides thereof with a facing comprising a fibrous-type layer of absorbent material, the absorbent material being preferably a mat or layer of short staple fibers, such as, for example, a fibrous sheet. Particularly suitable facing materials are the short staple fibers known as cotton linters when employed in the form of a sheeting or mat. When the fibrous layer is deposited on the film, the fibers will be in substantially intimate parallel formation. Thus it is to be appreciated that the fibrous facing layers may be of any suitable material for the ultimate use desired, providing of course, that they are absorbent and capable of adhering to the interior film layer to yield the laminated film product of this invention.

The fibrous facing layers may be applied to the plastic sheet interior layer in any desirable manner, the particular modes of application being conventional in the art. Thus, there may be employed any suitable adhesive agent or binder material to cement the layers which will exhibit characteristics suitable for the ultimate use of the product. It is to be appreciated that the adhesive material or binder may be any of the well-known adhesives employed in the binding of fibrous layers to plastic materials. It is necessary, however, that the adhesive chosen avoid the production of any hard, stiff areas or spots and that it will be nontoxic for the ultimate use contemplated. These adhesive materials may be applied by any of the methods known to the art, such as in the case of synthetics, by a hot-melt technique or through the use of a solvent in the formulation.

As pointed out, when adhesive materials are employed to effect adherence, the adhesives may be any of those known to the art, such as synthetic binders of various types, natural gums, starches, etc. Of the synthetic binding materials considered suitable, there may be mentioned the various types of acrylate copolymers now available commercially, such as copolymers of acrylic acids. Also, there may be mentioned polyvinyl acetate, copolymers of styrene and the like. It is also contemplated that natural gums, such as gum arabic, may be employed, if desired. A particularly preferred adhesive for use in forming the products of this invention is sold commercially under the trade name of Triplex and is an acrylate acetate which exhibits pressure sensitivity prior to final cure. It should be noted that, in situations where curing of the adhesive is necessary, this should be accomplished prior to placing of the slits in the multi-ply film product.

It is also to be understood, however, that the facing layer may be applied to the plastic sheeting by processes other than the mere application of an adhesive between the two layers. For example, techniques such as the provision of a hot-melt of the plastic film with the subsequent application of the facing layer thereto may be employed. Moreover, the layers may be connected by use of a thermoplastic binder in the fibrous layer which, upon the application of the heat, will cause the layers to adhere.

It is to be appreciated that the adhesive material performs to bond fiber to fiber as well as fiber to film. Therefore, the longitudinal tensile strength of the completed multi-ply film is the sum of the combined strength of the film, fiber and adhesive. The fiber laminae performs to absorb humidity, form bulk with light weight and insulate against short term temperature changes. In addition, the multi-ply film is dielectric.

When cementing the layers by use of an adhesive substance, it has been found that the amount of adhesive to be employed may range from a very small amount up to about 50 percent of the weight of the fibrous facing layer to be applied with particularly preferred amounts of about 15 to 30 percent. However, other amounts of this material may be employed as required.

It is also contemplated that mechanical interlocking may be employed to obtain adherence of the layers of the multi-ply film product. Thus the layers may be adhered by slitting with a heated slit roll which will cause adherence at the slit edges. Moreover it is contemplated that adherence may be obtained by carrying out the slitting operation with an unheated slit roll which results in mere mechanical interlocking as the resultant overlapping of the layers at the slit perimeters will provide sufficient adherence for the product of this invention.

Other methods of obtaining adherence of the layers in the multi-ply film products of this invention will become obvious to those skilled in the art from the instant teachings and all layers are considered to be within the scope of the present invention.

After formation of the multi-ply film construction described hereinabove, a plurality of elongated slits are placed therein in order to provide permeability and breathability for the product. As illustrated in FIG. 3, the elongated slits are adapted to extend completely through the plural layers of the construction to thereby provide the desired permeability and breathability. It is further to be noted that the slits are placed in the multi-ply film product in an aligned manner with regular spacings therebetween. Also, in the preferred embodiment, the length of the slits are the same.

A preferred orientation of the slits is that shown in FIGS. 1, 2, and 3 of the drawings accompanying the application wherein it may be seen that the slits are regularly placed in a straight line or in alignment with the transverse and longitudinal spaces therebetween being disposed in a regular manner. That is to say, all the transverse spaces will be of the same magnitude and the spaces between the ends of the slits are of the same magnitude. Thus, it is to be appreciated that, in the preferred form of the invention, the slits will appear to be in concise alignment of the spaces therebetween. It is further to be understood that the slits are to be placed in the multi-ply film product in such manner that they will always lie in a more or less straight line and, therefore, serve to evenly distribute the strength of the final multi-ply product.

In a preferred form of the invention relative to the disposition of the slits, the ratio of the magnitude of the slits to the lengthwise spacing therebetween is on the order of about 1:3, respectively, or, in other words, the length of the slit is about ¼ of the length of the spaces between the ends of each slit. In an especially preferred embodiment, the length of each slit is ⅟₁₆ inch whereas the spaces between the ends thereof are ³⁄₁₆ inch. It is to be understood, however, that any desirable magnitude of spacing and slit length may be employed as these criteria will be dependent upon the ultimate use for the final multi-ply film product. Thus, in certain applications, the slits may be very short with the spaces therebetween substantially greater than the length of the slits, whereas, in other instances, the length of the slits will be closer to the length of the lengthwise spaces between these slits.

The spaces disposed transverse of the slits may be any distance desirable although a preferred magnitude of these spaces has been found to be a space of about twice the length of the slit, such as, for example, where the length of each slit is ⅟₁₆ inch, the transverse spaces therebetween are about ⅛ inch. However, it is to be understood that this is not a particularly critical feature and may be varied as desired, the variance depending usually upon the desired utility of the product.

The slits may be disposed in the multi-ply product along the axis of orientation of the interior plastic sheet layer, transverse to the orientation of the sheet, diagonally of the axis of orientation, or in any other desired manner. However, in a particularly preferred embodiment of the invention, the slits are disposed along the axis of orientation of the interior plastic sheet layer, or in the direction of production of the plastic as this particular embodiment does not weaken the longitudinal strength of the plastic and thus provides a strong multi-ply film product while providing the desired breathability and permeability characteristics. It is to be appreciated in this respect that the slits are not placed in the multi-ply product to provide extensibility of the multi-ply formation but solely as a means of providing breathability and permeability thereof.

It is also to be appreciated that the fibers of the facing layers are in substantial parallel relation along the longitudinal direction of the slits. In a particularly preferred embodiment the fibers of the facing layers are disposed in substantial parallel relation along the longitudinal direction of the slits and also along the orientation of the interior plastic sheet layer. By having the fibers of the facing layers in substantial parallel relation, the drape and strength of the final product are substantially enhanced.

It is also contemplated according to this invention that the strength of the short staple fibrous layers may be enhanced by the addition thereto of a relatively small amount of fibrous reinforcement materials as required. This feature is of course dependent on the ultimate uses intended.

While the slits in the preferred embodiment are represented as being placed in the production direction of the multi-ply film product, or lengthwise, it is to be appreciated that the products may also be formed by regular spacing of the plurality of slits in any desirable manner. Thus, the slits may be placed transversely to the orientation or production direction of the plastic sheeting or diagonally to the production direction or orientation of the plastic sheeting as desired. However, it is to be appreciated that the spacing of the slits in this manner will serve to weaken the strength of the fabric somewhat and will not result in as strong a product as where the slits are placed along the orientation or production direction of the plastic sheeting as in the especially preferred embodiment.

By use of the phrase "production direction" of the plastic sheeting or multi-ply film product, it is intended to mean the direction of production or orientation of the film as it is produced. For example, the "production direction" of an extruded plastic sheet or film would be the longitudinal direction in which the plastic is extruded.

As pointed out hereinabove, the slits are placed in the multi-ply film material in such manner that they extend completely through the several layers of the product, a facet of the invention which is necessary to provide the desired breathability and permeability characteristics of the final product. Thus, it can be said that it is essential that the slits extend at least through the interior plastic film or sheet disposed in the fabric product. Otherwise, the product would be devoid of the desired breathability and permeability characteristics.

The multi-ply film product of this invention may be produced by any of several methods known to those skilled in the art. However, one form of method and apparatus for producing the instant product is illustrated in FIG. 4 of the drawings accompanying this application wherein the several layers present are shown in an enlarged view for clarity.

As may be seen in the diagrammatic view shown in FIG. 4, a sheet of plastic film 8, such as polyethylene sheeting, is obtained from a suitable source, such as source roll 9, and is forwarded past guide roll 10 and into a bath of adhesive material, designated generally as 11. The adhesive bath is designed to contain a sufficient amount of suitable adhesive material 12 as to ensure that plastic film 8 will be thoroughly coated on both sides thereof. As may be seen in the drawings, this coating procedure comprises the passage of plastic film 8 past immersed guide roller 13, through the bath and then out per guide roller 14.

After coated plastic film or sheet 8 emerges from adhesive bath 11, it is passed between rollers 15 and 15', which serve to evenly distribute the adhesive material contained on the respective sides of plastic sheet 8. After leaving rollers 15 and 15', plastic sheet 8 is then passed through a pair of conventional doctor blades 16 and 16' which serve to remove the excess adhesive or binder material 12 from the outer surfaces of the plastic sheet 8 and thus prepare the sheet for adhesion with the fibrous layers contained on source rollers 17 and 17'.

After passing doctor blades 16 and 16', suitable sheets of fibrous facing layers 18 and 18'; such as cotton linters, are obtained from rollers 17 and 17' and passed concurrently with, and on either side of, plastic film 8 through compression rollers 19 and 19' which serve to press fibrous layers 18 and 18' securely against either side of plastic film 8. At this stage of the operation, the fabric laminate is completed and ready for placing of the slits in the multi-ply film.

After passing compression rollers 19 and 19' laminated film construction 29 is passed over guide roller 20 atwhich point slitting roller 21, comprising roller 22 containing a plurality of longitudinal slitting knives 23, is provided to place the elongated slits in multi-ply film product 29. As may be seen in the drawing, as the multi-ply film 29 passes between rollers 20 and 21, the knives serve to place the desired slits through the multi-ply film as specified hereinabove. The knives 23, of course, may be spaced in any manner in order to obtain the desired spacings of the slits, the particular spacings desired usually being dependent upon the particular application of the final product.

After leaving the slitting operation, multiply film 29 may, if desired, be passed through a plurality of steam rollers, such as those indicated at 24 and 25, in order to complete the drying of the multi-ply film product 29 and, finally passed to wind up roll 26. At this point the product is complete and ready for its intended use as desired.

It is of course to be understood that drying of the multi-ply film may be carried out prior to the slitting operation as this method of operation would be particularly beneficial in the production of certain of the products of this invention. This will of course become obvious to those skilled in the art after becoming aware of the novel features of the product disclosed herein.

It is thus to be appreciated that the entire slitted multi-ply film product may be produced in a single operation employing conventional means. However, it is to be understood that the operation described above is merely illustrative of one type of method and apparatus for carrying out the production of the product of this invention.

Other suitable methods for producing the product may also be employed as desired. Thus, it is to be appreciated that the adhesive or binder material may be sprayed onto the plastic film and the fibrous material applied thereto as a sheet, or the binder material may be contained in admixture with the sheet of fibrous material. Also, the adhesion may be applied by employment of a heated slitting device thus effecting adhesion of the fibrous layer or facing to the plastic at the areas surrounding the slit. Moreover, the plastic may be provided by means of a hot-melt extrusion type process and the cooling thereof effecting the adhering operation. In a further embodiment, a thermoplastic binder may be provided either on the plastic interior layer or applied to the fibrous sheet material, which, upon the application of heat, will cause the several layers present to adhere to each other. It is, therefore, to be appreciated that a multiplicity of methods for forming the product of this invention become readily apparent once the particular construction thereof is known and disclosed.

It is also to be understood that various additive materials may be incorporated into any of the basic ingredients employed in forming the products of this invention. Thus there may be incorporated in either of the layers of the multi-ply film construction or in the binder material employed, any number and type of fillers, dyes, flame retardant materials, lubricants, plasticizers, such as di-2-ethylhexylphthalate, ultra-violet light stabilizers, bacteriostatic agents, and the like. It is, therefore, to be understood that the film product of this invention in combination with any of these noncritical additives or others which will become apparent to those skilled in the art, is to be considered as a part of the present invention.

It is also to be understood that any number of variations in either the particular materials employed in forming the slitted product of this invention or in the process and apparatus for the formation thereof may become obvious to persons skilled in the art in view of the disclosure of the invention set forth in the instant application. However, it is to be understood that all such obvious variations are to be included within the scope of the present invention.

The following example will serve to illustrate one embodiment of this invention and is to be considered as exemplary only.

EXAMPLE I

In this example the interior plastic layer consisted of a sheet of one-half mil extruded polyethylene and the fibrous facing material consisted of sheets of 100 percent cotton linter having a weigh of 9/10 ounce per square yard. The adhesive employed was an acrylic-type adhesive sold commercially under the trade name Triplex.

To the cotton linter sheet was added 10 percent by weight of the acrylic binder (Triplex) containing a decorative blue dye therein. The adhesively treated fibrous facing material was then applied to each side of the extruded polyethylene film and the lamina pressed and cured until the multi-ply film structure was obtained. Thereafter, elongated slits 1/16 inch in length were placed in the multi-ply product employing a ratio in length of spaces to slits of 3:1. This represented slits being 1/16 inch long with lengthwise spaces therebetween of 3/16 inch, the spaces being placed in the multi-ply film in the direction of the axis of orientation of the film. The transverse spaces between the slits were 1/8 inch wide.

When tested, this material showed a tensile strength of 21 pounds per square inch of width in the longitudinal direction and was found to be particularly suitable for use in hospital protective coverings.

While the invention has been described in detail with reference to specific embodiments thereof, various changes and modifications which fall within the sphere of the invention and scope of the appended claims will become apparent to the skilled artisan. The invention is, therefore, intended to be limited only by the appended claims or their equivalent.

What is claimed is:

1. A breathable, permeable, multi-ply sheet, comprising an interior plastic film layer, an adhesive layer on each side thereof, and a fibrous facing layer adhered to each adhesive layer, said sheet having a plurality of slits which extend through all of said layers and impart to said sheet the body characteristics of textiles, whereby said fibrous facing layers are adhered to said film layer at the edges of said slits.

2. The sheet of claim 1 wherein said facing layers comprise short staple fibers aligned in substantial parallel relationship.

3. The sheet of claim 2 wherein said fibers are in substantial parallel relationship along the longitudinal direction of said slits.

4. The sheet of claim 3 wherein said fibers are dispersed also along the orientation of said interior plastic film layer, whereby the drape and strength of said sheet are substantially enhanced.

5. The sheet of claim 4 wherein said slits are disposed in an aligned manner with regular spacings therebetween.

6. The sheet of claim 5 wherein said slits are of uniform length.

7. The sheet of claim 6 wherein the transverse and longitudinal spaces between said aligned slits are of the same magnitude.

8. The sheet of claim 7 wherein the ratio of the magnitude of the slits to the lengthwise spacing therebetween is approximately 1:3.

9. The sheet of claim 8 wherein the length of each of said slits is ⅛ inch and said transverse spaces between the ends thereof are 3/16 inch.

10. The sheet of claim 9 wherein said slits are straight.

References Cited
UNITED STATES PATENTS

| | | | |
|---|---|---|---|
| 3,331,728 | 7/1967 | Lane | 161—112 |
| 3,399,672 | 9/1968 | Crowe et al. | 128—156 |
| 3,446,208 | 5/1969 | Fukuda | 128—156 |
| 3,482,567 | 12/1969 | Franklin | 128—132 |

JOHN T. GOOLKASIAN, Primary Examiner

R. A. DAWSON, Assistant Examiner

U.S. Cl. X.R.

128—156, 296; 156—256; 161—109, 249

UNITED STATES PATENT OFFICE
CERTIFICATE OF CORRECTION

Patent No. 3,654,060　　　　　　　　Dated April 4, 1972

Inventor(s)　Maurice A. Goldman

It is certified that error appears in the above-identified patent and that said Letters Patent are hereby corrected as shown below:

Column 1, line 57, before the word "materials" insert -- paper --.

Column 4, line 71, "tI" should be -- It --.

Column 5, line 34, after the word "all" insert -- such obvious methods of providing adherence of the --.

Signed and sealed this 5th day of September 1972.

(SEAL)
Attest:

EDWARD M.FLETCHER,JR.　　　　　　　ROBERT GOTTSCHALK
Attesting Officer　　　　　　　　　　Commissioner of Patents